A. NIXON.
BUSH FOR TAP HOLES OF CASKS, BARRELS, JARS, OR OTHER VESSELS.
APPLICATION FILED OCT. 28, 1907.

948,566.

Patented Feb. 8, 1910.

WITNESSES.
Wm Cheney.
Joseph Bates.

INVENTOR.
Arthur Nixon
atty

UNITED STATES PATENT OFFICE.

ARTHUR NIXON, OF RUSHOLME, MANCHESTER, ENGLAND.

BUSH FOR TAP-HOLES OF CASKS, BARRELS, JARS, OR OTHER VESSELS.

948,566.   Specification of Letters Patent.   Patented Feb. 8, 1910.

Application filed October 28, 1907. Serial No. 399,595.

*To all whom it may concern:*

Be it known that I, ARTHUR NIXON, British subject, and resident of Rusholme, Manchester, county of Lancaster, England, have invented certain new and useful Improvements in Bushes for Tap-Holes of Casks, Barrels, Jars, or other Vessels, of which the following is a specification.

This invention relates to a new or improved construction of bush for the tap holes of casks and barrels or for jars or other vessels.

The invention will be fully described with reference to the accompanying drawings forming part of the specification.

Figure 2:
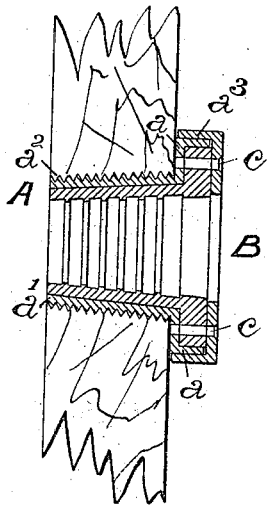
Figure 6:
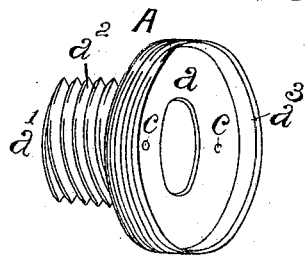
Figure 1:
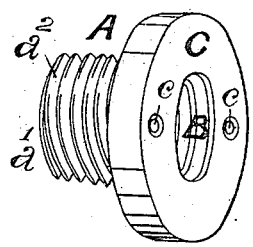
Figures 3, 4, 5:
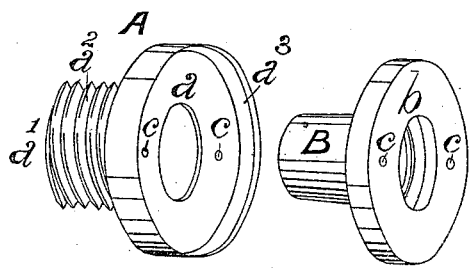

Figure 1. Perspective view of the bush. Fig. 2. Longitudinal section of same. Fig. 3. Perspective view of the outer casing A. Fig. 4. Perspective view of the liner B. Fig. 5. Perspective view of the cap or cover C. Fig. 6. Perspective view of casing showing a modification.

The improved bush comprises an outer casing A of metal to fit into the tap hole of the cask or barrel, with a hollow annular flange $a$, a liner B of rubber or rubber composition, or other flexible material to fit into the casing A, with a flange $b$ to fit into the hollow flange of the casing, and a cap or cover C to fit over the hollow flange $a$ and inclose the flange $b$ of the liner B.

The casing A is made with a tapering sleeve $a'$ with a screw thread $a^2$ if desired so as to screw into the tap holes and with a hollow flange $a$ having sides $a^3$ to completely inclose the flange $b$ of the liner B. The liner B is of corresponding shape to the casing A to fit into the interior and the inner surface may be plain or grooved preferably the latter to make a good joint with the tap when inserted.

The cap or cover C is fitted over the hollow flange $a$ of the casing A and incloses and covers the flange $b$ of the liner B leaving the central hole free to receive the tap. This cap or cover C fits over the flange of the casing and is also preferably provided with holes $c$ for screws to pass through it and through the flanges of the liner B and casing A into the wood of the cask to secure the bush in position. The flange $a^3$ of the bush and the cap C may be screw threaded as in Fig. 6.

What I claim as my invention and desire to protect by Letters Patent is:—

A bush for tap holes comprising in its construction an externally tapering screwed metal sleeve A with screw threads $a^2$ at one end and a hollow flange $a$ at the other end, externally screw threaded sides $a^3$ to the flange $a$, a flexible liner B of corresponding shape with a flange $b$ at one end to fit within the hollow flange $a$ and a cap C with internal screw to screw over the sides of the hollow flange $a$ and inclose the flange $b$ of the flexible liner B and retain the latter in position substantially as described.

In witness whereof, I have hereunto signed my name in the presence of two subscribing witnesses.

ARTHUR NIXON.

Witnesses:
 J. OWDEN O'BRIEN,
 HARRY BARNFATHER.